US006715940B2

(12) United States Patent
Top et al.

(10) Patent No.: US 6,715,940 B2
(45) Date of Patent: Apr. 6, 2004

(54) RUGGED MINIATURE PAN/TILT DOME CAMERA ASSEMBLY

(75) Inventors: Arnold N. Top, Albany, OR (US); Walter E. Lindsley, Jr., Corvallis, OR (US); J. Steve Schaberg, Corvallis, OR (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/238,838

(22) Filed: Sep. 10, 2002

(65) Prior Publication Data

US 2004/0047623 A1 Mar. 11, 2004

(51) Int. Cl.[7] .......................... G03B 17/00

(52) U.S. Cl. .......................... 396/427; 348/143

(58) Field of Search .......................... 396/427, 428; 348/143, 150, 151, 152

(56) References Cited

U.S. PATENT DOCUMENTS 4,945,367 A * 7/1990 Blackshear .................. 396/427
2001/0055487 A1 * 12/2001 Akada .................. 396/427

OTHER PUBLICATIONS

"Combination Pan/Tilt Dome Camera" Specifications Web Page www.ktnc.co/kr/product/new/combil.htm, printed Sep. 9, 2002, Korea Technology and Communication, Buchon City, Korea, p. 1 of 1.
"Combination Pan/Tilt Dome Camera" Installation and Wiring Diagram Web Page www.ktnc.co.kr/product/new/combil.htm, printed Sep. 9, 2002, Korea Technology and Communication, Buchon City, Korea, p. 1 of 1.

* cited by examiner

*Primary Examiner*—David M. Gray
(74) *Attorney, Agent, or Firm*—Stoel Rives LLP

(57) ABSTRACT

A dome camera assembly (10) of this invention includes a base housing (12) and a transparent dome (14). A pan motor (18), a tilt motor (20), and a video camera (22), are mounted to a movable platform (24) that is suspended by horizontal and vertical bearings (32, 36) to a platform support ring (26) attached to the base housing. The pan motor is direct-coupled to the platform support ring by a panning drive wheel (28) that pans the video camera through azimuthal angles. The tilt motor is attached to the movable platform and is directly coupled to the video camera for tilting the camera through elevation angles. The pan and tilt motors are mounted in a balanced configuration at opposite sides of the video camera with their drive shafts rotating about a common axis that extends through the center of gravity of the video camera.

33 Claims, 4 Drawing Sheets

RUGGED MINIATURE PAN/TILT DOME CAMERA ASSEMBLY

RELATED APPLICATIONS

Not applicable

FEDERALLY SPONSORED RESEARCH OR DEVELOPMENT

Not applicable

TECHNICAL FIELD

This invention relates to security systems, and more particularly to a dome housing assembly including a panning and tilting mechanism for a video camera.

BACKGROUND OF THE INVENTION

It is well known to employ video cameras in locations, such as banks, casinos, and retail stores to monitor security. Video cameras are also employed outdoors to monitor parking lots, traffic, and weather conditions.

To make them inconspicuous and protect them from tampering and the environment, such video cameras are typically mounted in dome housings that include relatively large, high torque, motors for panning and tilting the cameras. The panning and tilting mechanisms often employ reduction gears, linkages, and drive belts to couple the drive motors to the cameras. Such mechanisms typically result in a relatively large, 15 to 31 centimeter (6 to 12 inch), diameter, high profile dome housing that is subject to vibrations and reliability problems. Of course, such a housing is unduly conspicuous and has limited applicability where space is limited.

In outdoor applications, video cameras are subject to widely varying environmental conditions that subject them to problems, such as dome fogging. Accordingly, prior dome camera housings have employed "defrosting" heaters. All of these considerations lead to a dome housing and video camera assembly that is unduly large, complex, and costly.

What is still needed, therefore, is a dome housing and video camera assembly that overcomes these problems.

SUMMARY OF THE INVENTION

An object of this invention is, therefore, to provide a video camera housing having a significantly smaller size and profile.

Another object of this invention is to provide a video camera housing having a compact, simple, and reliable camera panning and tilting mechanism.

Yet another object of this invention is to provide a video camera housing that is rugged, suitable for use outdoors, and is significantly less costly cost to manufacture.

A rugged, miniature pan/tilt dome camera assembly of this invention includes a base housing and a transparent dome that is attached to the base housing by a dome mounting flange. The base housing holds internal components including a pan motor, a tilt motor, and a video camera, all of which are mounted to a movable platform that is suspended by horizontal and vertical bearings to a platform support ring that is attached to the base housing.

The drive shaft of the pan motor is direct-coupled to the platform support ring by a panning drive wheel that includes a compliant "tire" for providing friction between to the platform support ring. The bearings suspending the movable platform to the platform support ring apply continuous pressure for driving friction between the panning drive wheel and the platform support ring when panning the video camera through azimuthal angles.

The tilt motor is attached to the movable platform and its drive shaft is directly coupled to the video camera for tilting the camera up and down through a range of elevation angles. Unlike prior dome camera assemblies, the pan and tilt motors are both mounted on the movable platform rather than one or both being mounted to the base housing. Moreover, the pan and tilt motors are mounted in a balanced configuration on the movable platform at opposite sides of the video camera. The drive shafts of the pan and tilt motors preferably rotate about a common axis that extends through the center of gravity of the video camera. The pan and tilt motors directly drive the movable platform and the video camera without gears, belts, pulleys, or the like, which reduces parts costs, size requirements, and improves reliability. Moreover, the balanced mounting configuration allows a reduced height for the base housing and reduces the motor torque requirements, thereby improving camera positioning speed and accuracy.

Additional aspects and advantages of this invention will be apparent from the following detailed description of preferred embodiments thereof, which proceed with reference to the accompanying drawings.

DETAILED DESCRIPTION OF PREFERRED EMBODIMENTS

Figure 1:
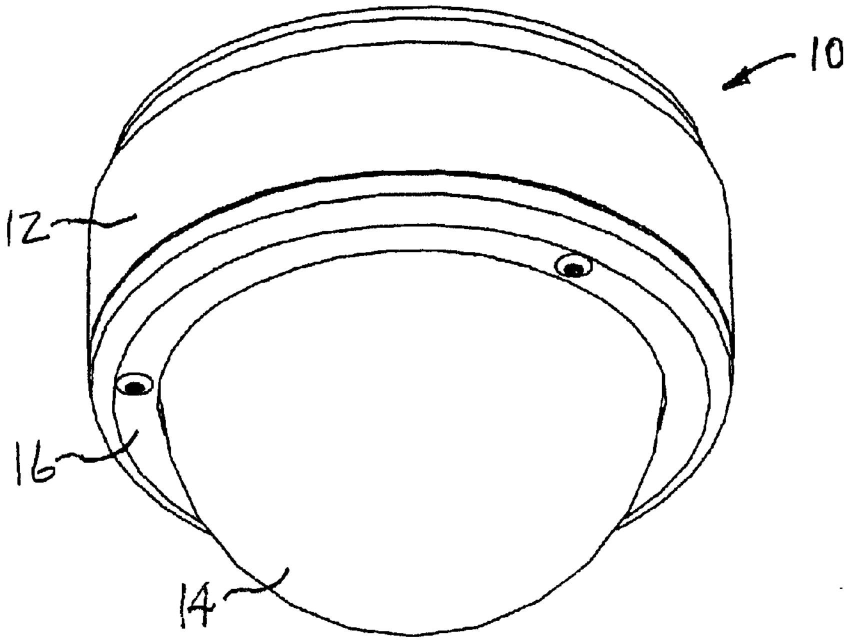
FIG. 1 is an external isometric view of the rugged miniature pan/tilt dome camera assembly of this invention.

FIG. 1 shows a rugged, miniature pan/tilt dome camera assembly 10 of this invention, which includes a base housing 12 and a transparent dome 14 that is attached to base housing 12 by a dome mounting flange 16. FIG. 1 shows dome camera assembly 10 in its typical operating orientation.

Figure 2:
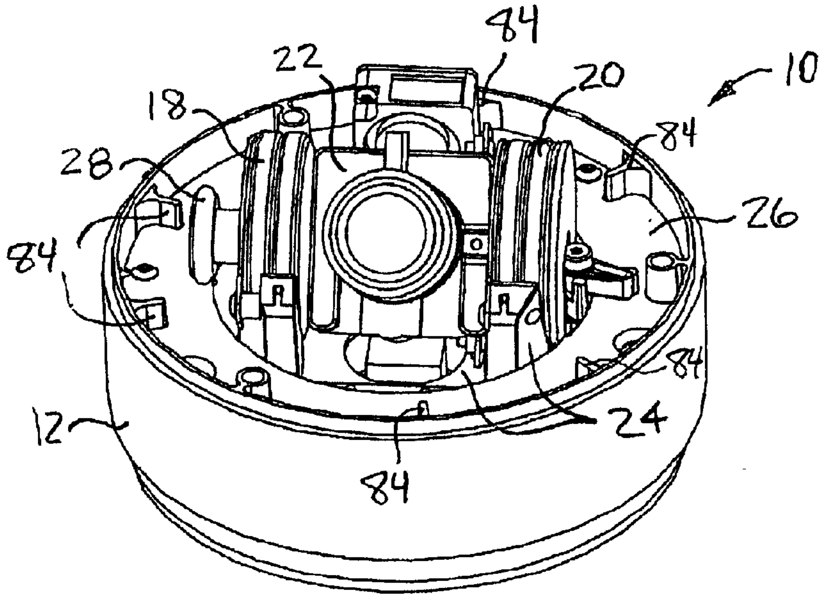
FIG. 2 is an isometric view of the camera assembly of FIG. 1 with the dome removed to reveal camera pan and tilt drive motors mounted to a movable platform that is suspended by a platform support ring attached to a base housing.

FIG. 2 shows dome camera assembly 10 inverted and with dome 14 removed to reveal internal components including a pan motor 18, a tilt motor 20, and a video camera 22, all of which are coupled to a movable platform 24 that is suspended by bearings (FIG. 3) to a platform support ring 26 that is attached to base housing 12.

The drive shaft of pan motor 18 is mechanically direct-coupled to platform support ring 26 by a panning drive wheel 28 that reduces alignment issues during assembly. Panning drive wheel 28 preferably includes a compliant "tire" that provides friction between panning drive wheel 28 and platform support ring 26. The bearings (FIG. 3) suspending movable platform 24 to platform support ring 26 are designed to apply continuous pressure for driving friction between panning drive wheel 28 and platform support ring 26 when panning video camera 22 left and right at through azimuthal angles. Of course, alternative panning drive mechanisms are possible including gears or belts.

Tilt motor 20 is attached to movable platform 24 and its drive shaft is directly coupled to video camera 22 for tilting the camera up and down through elevation angles. Unlike prior dome camera assemblies, pan motor 18 and tilt motor 20 are both mounted on movable platform 24, rather than one or both being mounted to base housing 12. Moreover, pan motor 18 and tilt motor 20 are mounted in a balanced configuration on movable platform 24 at opposite sides of video camera 22. The drive shafts of motors 18 and 20 preferably rotate about a common axis that extends through the center of gravity of video camera 22. Pan and tilt motors 18 and 20 are designed for directly driving movable platform 24 and video camera 22 without gears, belts, pulleys, or the like. This reduces parts costs, size requirements, and improves reliability. Moreover, the balanced mounting configuration allows a reduced height of less than 10.16 cm (4 inches) for base housing 12, and reduces the motor torque requirements, thereby improving camera positioning speed and accuracy.

A specialized motor drive controller (not shown) allows pan and tilt motors 18 and 20 to preferably employ low cost stepper motors. The motor drive controller performs linearization of the motor drive signals so that small micro-steps can be made The linearized micro-steps provide a smooth panning or tilting of video camera 22 at slow speeds and in both elevations and azimuth directions. The linearization requires different commands for moving in one direction than the other. The motor drive controller design contributes to eliminating the need for gears and belts, without requiring more costly high-torque micro-stepping motors.

Figure 3:
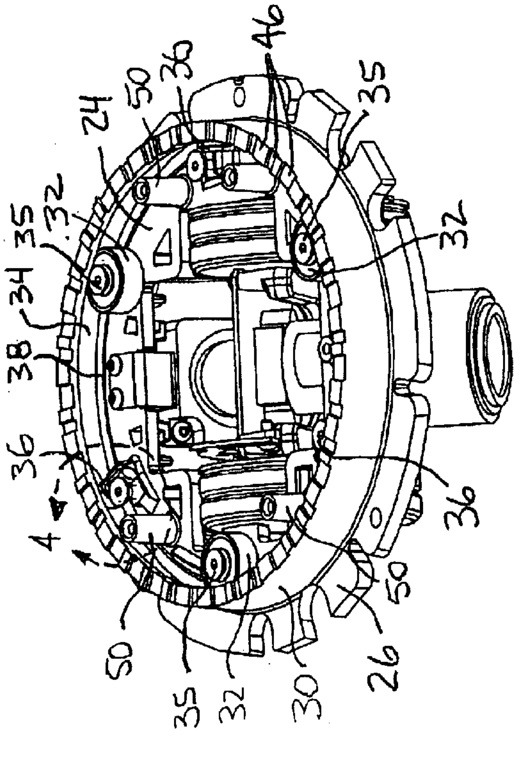
FIG. 3 is a bottom isometric view of the platform support ring revealing a pseudo random encoder pattern molded therein for sensing an azimuthal angle of the movable platform of FIG. 2.

FIG. 3 shows an inverted view of platform support ring 26, which further includes a bearing race 30. Preferable distributed at 120° intervals around the periphery of movable platform 24 are three horizontal bearings 32 that mate with a track 34 that is formed within the inner-facing wall of bearing race 30. Horizontal bearings 32 are attached to movable platform 24 by spindle mounting screws 35. Horizontal bearings 32 contact track 34 with a minimal force suitable to prevent lateral displacement of movable platform 24 relative to platform support ring 26. To facilitate assembly of movable platform 24 to platform support ring 26, horizontal bearings 32 are readily attached or removed from movable platform 24 by respectively tightening or loosening spindle mounting screws 35.

Also preferably distributed at 120° intervals around the periphery of movable platform 24 are three vertical bearings 36 that mate with a flat surface 38 that is formed along an edge of track 34. Vertical bearings 36 are preferably offset 60° from horizontal bearings 32 and contact flat surface 38 with a minimal force suitable to prevent vertical displacement of movable platform 24 relative to platform support ring 26.

Figure 4:
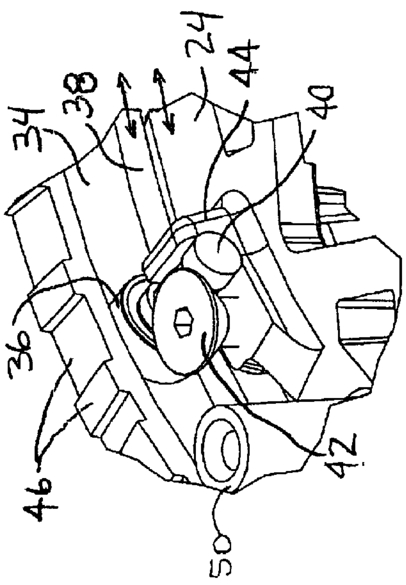
FIG. 4 is an enlarged fragmentary view taken at location "4" of FIG. 3 revealing details of a vertical bearing assembly for rotatably mounting the movable platform to the platform support ring.

FIG. 4 shows mounting details of a typical one of vertical bearings 36 on movable platform 24. Vertical bearing 36 rotates about a support spindle 40 that is captivated between the head of a screw 42 and a mounting boss 44 formed in movable platform 24. To facilitate assembly of movable platform 24 to platform support ring 26, support spindle 40 is readily attached or removed from movable platform 24 by respectively tightening or loosening screw 42.

The arrangement of horizontal and vertical bearings 32 and 36 provides suitable alignment accuracy for ensuring that panning drive wheel 28 properly contacts the driving surface of platform support ring 26 without applying undue pressure. This arrangement contributes to reducing the overall height of base housing 12 (FIG. 1).

Figure 5:
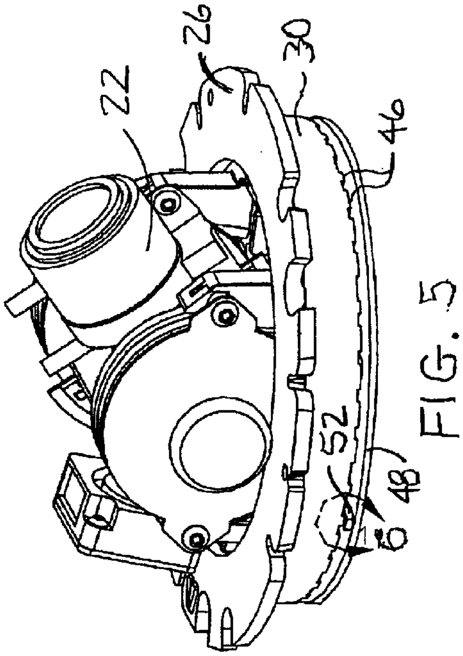
FIG. 5 is a side isometric view of the platform support ring of FIG. 3 further showing a circuit board and optical sensor that are mounted to the movable platform.

FIGS. 3–5 further show that bearing race 30 includes a lower marginal surface onto or into which is formed an azimuthal angle encoding pattern 46, which is preferably a well known optically readable pseudorandom or chain code pattern. Encoding pattern 46 is preferably printed onto bearing race 30, but alternatively may be milled, engraved, molded (as shown), or embossed.

Figure 6:
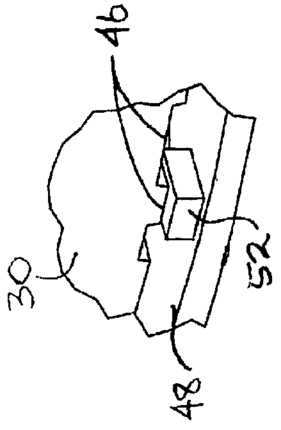
FIG. 6 is an enlarged fragmentary view taken at location "6" of FIG. 5 revealing details of the encoder pattern, circuit board, and optical sensor.

Referring also to FIG. 6, a circuit board 48 is mounted to bosses 50 (FIGS. 3 and 4) that protrude from movable platform 24. Circuit board 48 is preferably circular and sized to match the periphery of bearing race 30. An optical sensor 52 is mounted on the periphery of circuit board 48 and facing encoder pattern 46. Bosses 50 are sized such that optical sensor 52 is spaced apart a distance from encoder pattern 46 suitable for accurately recognizing the azimuthal angle of video camera 22 relative to platform support ring 26. Employing the pseudorandom or chain code pattern ensures that the azimuthal angle of video camera 22 is readable shortly after powering up dome camera assembly 10 as well as during thousands of rotational movements of video camera 22.

Figure 7:
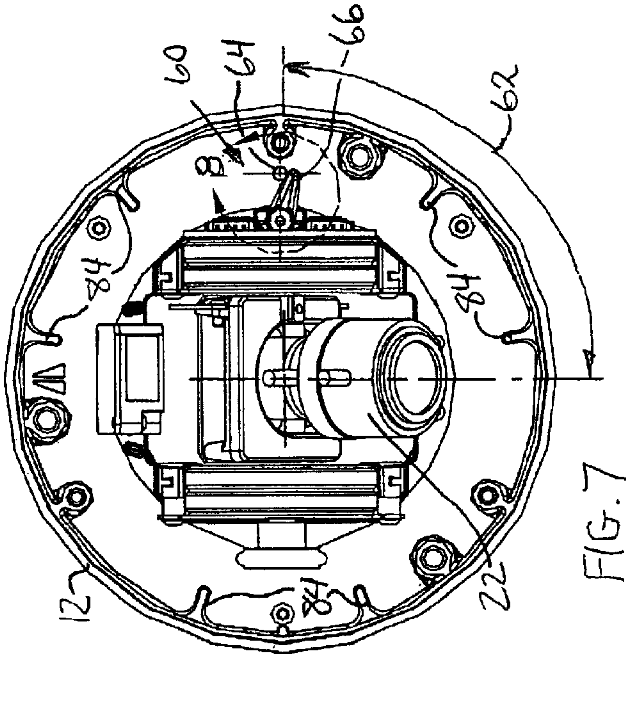
FIG. 7 is a top plan view of the camera assembly of FIG. 1 with the dome removed to reveal a pivot stop that allows slightly more than 360 degrees of rotation between the movable platform ring and the platform support.
Figure 8:
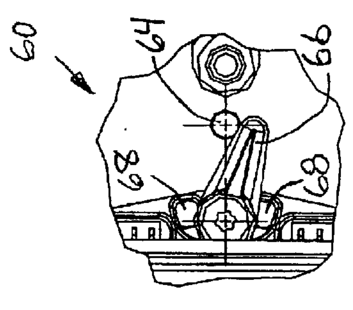
FIG. 8 is an enlarged fragmentary view taken at location "8" of FIG. 7 revealing structural details of the pivot stop.

FIGS. 7 and 8 show a panning stop 60 of this invention that allows at least 360° of panning rotation for an azimuthal angle 62 of video camera 22. Convention panning stops sacrifice a few degrees of rotation, thereby not allowing a full 360° of rotation. By way of example only, azimuthal angle 62 is measured relative to a stop post 64, which could be positioned at many angular locations relative to video camera 22. Panning stop 60 further includes a pivoting member 66 that freely swings through an arc that is limited in extent by a pair of arc stops 68. The example of FIGS. 7 and 8 shows that panning stop 60 allows azimuthal angle 62 to range from 0° to about 360°. However, panning stop 60 can be configured to allow azimuthal angle 62 to span greater than 360°.

Figure 9:
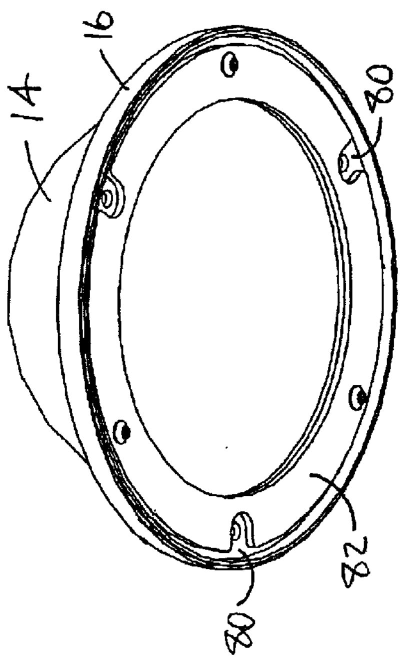
FIG. 9 is a bottom isometric view of a dome and dome support ring of this invention.

FIG. 9 shows a bottom view of dome 14 and dome mounting flange 16 in which dome 14 is preferably a hemisphere of clear molded plastic. Dome 14 includes an outward extending lip 80 that is captured between dome mounting flange 16 and a dome support ring 82 that is preferably formed from a rigid metallic material. Referring also to FIGS. 2 and 7, base housing 12 further includes dome support ribs 84 that are distributed around the inner periphery of base housing 12 and sized such that they contact a major surface of dome support ring 82 when dome 14 is assembled to base housing 12. The resulting assembly is compact, rugged, and provides a strong mechanical support of dome 14 by base housing 12. The overall width or diameter of base housing 12 is preferably less than 11 centimeters (4.3 inches).

Figure 10:
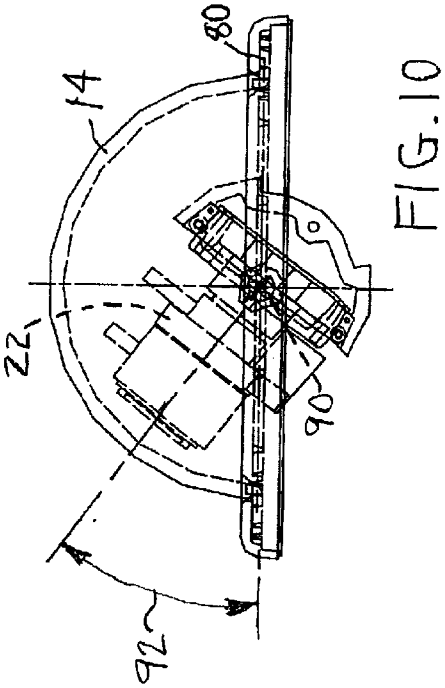
FIG. 10 is a side view of the dome showing its hemispherical shape with a camera shown in phantom mounted for pan/tilt movement about the optical and geometric center of the dome.

FIG. 10 shows that video camera 22 is preferably mounted such that the common axis of pan and tilt motors 18 and 20 pass through a center of curvature 90 of dome 14. Assuming that dome 14 is hemispherical, center of curvature 90 coincides with the optical center of dome 14. This allows video camera 22 to tilt through a range of elevation angles 92 and pan through a range of azimuthal angles 62 (FIG. 7) without visual distortions and aberrations that might otherwise be caused by the materials forming dome 14.

Figure 11:
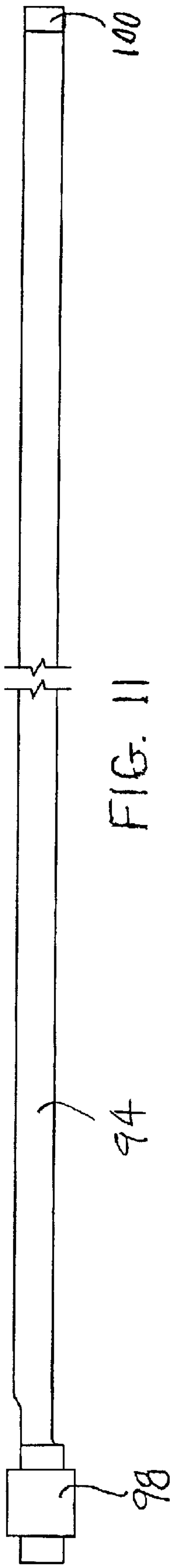
FIG. 11 is a plan view of a flexible circuit strip of this invention.
Figure 12:
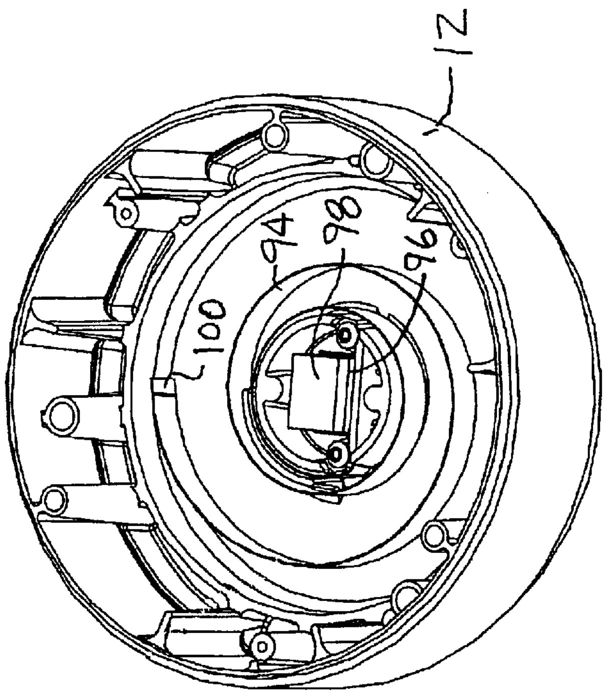
FIG. 12 is an isometric view into a base housing of the dome camera assembly of this invention showing the flexible circuit strip of FIG. 11 coiled into a spiral for communicating power and data to and from the camera pan/tilt structures during at least 360 degrees of panning rotation.

FIGS. 11 and 12 show a flexible circuit strip 94 that communicates power and data between etched circuit board 48 (FIGS. 5 and 6) and a connector 96 mounted in the bottom of base housing 12. Flexible circuit strip 94 includes a mating connector 98 at its first end and a connection termination 100 at its second end. Connectors 96 and 98 are mated together and flexible circuit strip 94 is coiled into a spiral (like a clock spring) in the bottom of base housing 12. Connection termination 100 is mated to a connector (not shown) on the bottom surface of etched circuit board 48. This arrangement allows etched circuit board 48, which is mechanically coupled to movable platform 24, to pan through at least 360° of rotation and eliminates any costly wireless power and data transmission via radio frequency, infrared, or inductive couplings. Employing flexible circuit strip 94 also reduces the size and improves the reliability of dome camera assembly 10.

In an alternative embodiment in which panning stop 60 (FIGS. 7 and 8) may be eliminated, a controller on etched circuit board 48 maintains the status of azimuthal angle 62 (readable even at power-up by encoding pattern 46) and automatically ensures that flexible circuit strip 94 is never wound too tightly nor unwound too loosely. This is accomplished by converting panning commands that might otherwise over or under pan video camera 22 into panning commands that rotate video camera 22 in an opposite direction (sometimes panning it almost all the way around) to reach the commanded azimuthal angle 62.

When conventional dome camera assemblies are employed in outdoor applications, heaters are often required to ensure proper functioning of the camera and electronics, and to prevent the formation of ice, frost, or condensation on within dome camera assembly 10 or on dome 14. Heaters are especially common in very cold environments. However, dome camera assembly 10 of this invention is sufficiently compact, that heat generated by pan and tilt motors 18 and 20 is sufficient to prevent the formation of ice, frost, or condensation. Therefore, added heaters are not required, further saving cost and reducing the size of dome camera assembly 10.

Skilled workers will recognize that portions of this invention may be implemented differently from the implementations described above for preferred embodiments. For example: various bearing arrangements are possible including a single set of bearings riding in a "TV" shaped bearing race; fabricating the dome from any of a variety of transparent or tinted materials; employing a wide variety of components types and dimensions; employing AC or DC servo motors in place of stepper motors; and employing other forms of encoders including simple potentiometers.

It will be obvious to those having skill in the art that many other changes may be made to the details of the above-described embodiments of this invention without departing from the underlying principles thereof. The scope of the present invention should, therefore, be determined only by the following claims.

We claim:

1. An apparatus for housing, panning, and tilting a video camera, comprising:

- a base housing;
- a platform support attached to the base housing;
- a movable platform suspended relative to the platform support, the video camera having first and second sides and located centrally relative to the movable platform;
- a pan motor attached to the movable platform adjacent to the first side of the video camera and mechanically coupled to the platform support to effect panning of the movable platform through a range of azimuthal angles relative to the platform support; and
- a tilt motor attached to the movable platform adjacent to the second side of the video camera and directly coupled to the video camera to effect tilting of the video camera through a range of elevation angles relative to the platform support.

2. The apparatus of claim 1, in which the platform support includes a ring-shaped member.

3. The apparatus of claim 2, further including a panning drive wheel that is directly coupled to the pan motor and frictionally coupled to the ring shaped member to effect the panning of the movable platform.

4. The apparatus of claim 1, in which the movable platform is suspended relative to the platform support by at least one set of bearings.

5. The apparatus of claim 1, in which the movable platform is suspended relative to the platform support by at least three vertical bearings and at least three horizontal bearings.

6. The apparatus of claim 5, in which the platform support further includes a bearing race in which the vertical and horizontal bearings run.

7. The apparatus of claim 1, in which the platform support further supports an encoder pattern and the movable platform further supports an optical sensor that senses the encoder pattern to determine an azimuthal angle of the video camera relative to the platform support.

8. The apparatus of claim 1, in which at least one of the pan motor and the tilt motor is a stepper motor.

9. The apparatus of claim 1, further including a panning stop having a pivoting member that allows panning of the movable platform through a limited range of azimuthal angles including at least 360 degrees.

10. The apparatus of claim 1, in which the movable platform further supports a circuit board that is mounted substantially parallel to and below the movable platform.

11. The apparatus of claim 10, further including a flexible circuit strip having first and second ends that is coiled in a spiral configuration within the base housing, the first end electrically connected to the circuit board and the second end electrically connected to a connector in the base housing, the spiral configuration effecting continuous electrical connections between the circuit board and the connector while the circuit board rotates through azimuthal angles ranging from zero degrees to 360 degrees.

12. The apparatus of claim 1, further including a dome that is mounted to the base housing for enclosing the video camera within the apparatus.

13. The apparatus of claim 1, in which the pan and tilt motors provide a sufficient amount of heat to prevent a formation of condensation on the apparatus.

14. The apparatus of claim 12, further including a dome mounting flange and in which the dome further includes a lip that is captured between the dome mounting flange and the base housing.

15. The apparatus of claim 14, further including a dome support ring and in which the base housing further includes dome support ribs for supporting the dome support ring, which is captured along with the lip to strengthen the mounting of the dome to the base housing.

16. The apparatus of claim 1, in which the apparatus has an overall width of 11 centimeters or less.

17. The apparatus of claim 1, in which the apparatus has an overall height of 10.16 centimeters or less.

18. An apparatus for housing, panning, and tilting a video camera, comprising:

a base housing;

a platform support attached to the base housing;

a movable platform suspended relative to the platform support by at least three vertical bearings and at least three horizontal bearings, the video camera having first and second sides and located centrally relative to the movable platform;

a pan motor attached to the movable platform adjacent to the first side of the video camera and mechanically coupled to the platform support to effect panning of the movable platform through a range of azimuthal angles relative to the platform support; and a tilt motor attached to the movable platform adjacent to the second side of the video camera and directly coupled to the video camera to effect tilting of the video camera through a range of elevation angles relative to the platform support.

19. The apparatus of claim 18, in which the platform support includes a ring-shaped member.

20. The apparatus of claim 19, further including a panning drive wheel that is directly coupled to the pan motor and frictionally coupled to the ring shaped member to effect the panning of the movable platform.

21. The apparatus of claim 18, in which the movable platform is suspended relative to the platform support by at least one set of bearings.

22. The apparatus of claim 18, in which the platform support further includes a bearing race in which the vertical and horizontal bearings run.

23. The apparatus of claim 18, in which the platform support further supports an encoder pattern and the movable platform further supports an optical sensor that senses the encoder pattern to determine an azimuthal angle of the video camera relative to the platform support.

24. The apparatus of claim 18, in which at least one of the pan motor and the tilt motor is a stepper motor.

25. The apparatus of claim 18, further including a panning stop having a pivoting member that allows panning of the movable platform through a limited range of azimuthal angles including at least 360 degrees.

26. The apparatus of claim 18, in which the movable platform further supports a circuit board that is mounted substantially parallel to and below the movable platform.

27. The apparatus of claim 26, further including a flexible circuit strip having first and second ends that is coiled in a spiral configuration within the base housing, the first end electrically connected to the circuit board and the second end electrically connected to a connector in the base housing, the spiral configuration effecting continuous electrical connections between the circuit board and the connector while the circuit board rotates through azimuthal angles ranging from zero degrees to 360 degrees.

28. The apparatus of claim 18, further including a dome that is mounted to the base housing for enclosing the video camera within the apparatus.

29. The apparatus of claim 18, in which the pan and tilt motors provide a sufficient amount of heat to prevent a formation of condensation on the apparatus.

30. The apparatus of claim 28, further including a dome mounting flange and in which the dome further includes a lip that is captured between the dome mounting flange and the housing.

31. The apparatus of claim 30, further including a dome support ring and in which the base housing further includes dome support ribs for supporting the dome support ring, which is captured along with the lip to strengthen the mounting of the dome to the base housing.

32. The apparatus of claim 18, in which the apparatus has an overall width of 11 centimeters or less.

33. The apparatus of claim 18, in which the apparatus has an overall height of 10.16 centimeters or less.

* * * * *